United States Patent [19]
Letemps et al.

[11] Patent Number: 4,775,402
[45] Date of Patent: Oct. 4, 1988

[54] GLASS MOLDING SYSTEM

[75] Inventors: Bernard Letemps; Jean-Marc Petitcollin, both of Thourotte; Francis Perin, Sauvigny les Bois; Herve Prouveur, Liev-Saint Amand, all of France

[73] Assignee: Saint-Gobain Vitrage, Courbevoie, France

[21] Appl. No.: 33,791

[22] Filed: Apr. 3, 1987

[30] Foreign Application Priority Data

Apr. 3, 1986 [FR] France ................................ 86 04774

[51] Int. Cl.$^4$ ........................................... C03B 23/025
[52] U.S. Cl. ...................................... 65/107; 65/104; 65/273; 65/287
[58] Field of Search ................. 65/104, 106, 107, 273, 65/287

[56] References Cited

U.S. PATENT DOCUMENTS

| 4,204,854 | 5/1980 | McMaster et al. | 65/106 |
| 4,511,387 | 4/1985 | Kellar et al. | 65/104 X |
| 4,682,997 | 7/1987 | Halberschmidt et al. | 65/106 |

Primary Examiner—Arthur Kellogg
Attorney, Agent, or Firm—Oblon, Fisher, Spivak, McClelland & Maier

[57] ABSTRACT

The invention concerns a glass molding process and system according to which glass sheet is heated in a horizontal position in a heating furnace, transferred vertically to an upper mold having a radius of curvature greater than the radius of curvature that it is desired to give the glass sheet and dropped on a bending frame where the glass sinks under the effect of inertia and gravity. Vertical transfer of the glass is obtained by a vacuum created on the periphery of the upper mold.

14 Claims, 4 Drawing Sheets

GLASS MOLDING SYSTEM

BACKGROUND OF THE INVENTION

1. Field of the Invention

This invention concerns glass molding techniques and especially techniques for obtaining tempered shaped glass sheet, used in automobiles or other vehicles forwindshields, side windows, rear windows or even sliding roofs.

2. Background of the Prior Art

The manufacture of such automobile windows is usually obtained by a sequence of three different stages, heating of the glass to its softening point, deformation of the flat glass sheet to make it adopt the desired curvature and, finally, a tempering of the glass to give it greater shock resistance and greater splintering in case of breakage. One of the industrial methods most often used consists of heating of the glass in a horizontal heating furnace in which the flat glass sheets are loaded one by one, and conveyed, for example, on a roller bed. The conveyor is extended beyond the heating furnace and then carries the glass sheet to the molding station. The glass sheet is bent into convex shape there and is then released before being sent to the tempering station.

Patent publication EP No. 0 003 391, in the names of Messrs. Harold McMaster, Norman Carl Nitschke and John Stephen Nitschke, describes a system specially adapted for the manufacture of tempered automobile windows, which contains a horizontal furnace crossed by a conveyor, a bending system and a tempering system. Bending is carried out on a frame where the glass sheet sinks under the effect of inertia and gravity and takes the desired shape before being conducted to the cooling or tempering station.

Transfer from the conveyor crossing the furnace to the bending frame is obtained by suction of the glass sheet, which is flattened against a flat upper suction mold of refractory mortar, drilled with multiple holes over all or part of its surface and greater in area than that of the glass sheet to be molded. Those holes, regularly distributed, connect with a vacuum chamber, so that the whole surface of the glass sheet is sucked up to the upper mold. The bending frame is then brought under the lifted sheet and collects it after the vacuum has ceased.

Molding and tempering systems of this type are widely used owing to the rapid production rates they make it possible to obtain, while respecting the optical qualities required by automobile manufacturers.

However, such systems are specially reserved for mass production and are generally poorly suited for the treatent of series of windows presenting relatively appreciable differences from each other in dimensions, on the order, for example, of at least a few centimeters.

Actually, with an upper mold, such as described in patent No. EP 0 003 391, it is certainly possible to take in succession volumes of glass of different sizes, but, in practice, it was observed that good optical results could be assured only when the volumes of a new series did not cover the zone occupied by the edges of the volumes previously treated. Furthermore, any change of the upper mold raises numerous problems of handling the heavy refractory mortar mold and of setting temperature.

Additionally, difficult problems are created by enameled windows, that is, those bearing an enamel coating over all or part of one of their faces. Now, they constitute at present the great majority of windows, enamel having, among other things, an esthetic function in the case of enamel strips deposited along the edges of windows mounted by cementing, particularly in automobiles; furthermore, enamel prevents the cement from deteriorating under the sunlight, a sun visor function in the case of sliding roofs or also a function of electricity conduction and/or of covering electric leads or "busbars" for rear windows of vehicles equipped with self-deicing systems. This unrestricted enumeration shows how uncommon automobile windows not coated with enamel are.

The enameling techniques used demand vitrification at a temperature equivalent to that necessary for bending and/or tempering of the glass. It has, of course, been proposed that this vitrification be carried out in the heating furnace with a view to bending and tempering, which means that the glass sheet is loaded in said furnace, while it presents a nonvitrified, generally cloudy appearance on the top face, that is, on the face which is not in contact with the conveyor and will, consequently, later be in contact with the upper mold, while the enamel in the course of vitrification is still very fragile, sensitive to abrasion and sticky.

That contact between the enamel and the upper mold entails, on the one hand, a rather appreciable deterioration of the enameled strips and, on the other, soiling of the upper mold. Furthermore, the contact surface of the upper mold is very often covered with refractory paper or cloth, which produces a softer contact with the glass, but on which the enamel has a strong tendency to stick, which necessitates frequent replacements of the refractory paper or cloth and, therefore, multiple production interruptions. To reduce their frequency, one can, of course, choose to treat volumes of decreasing sizes, thus preventing unenameled glass surfaces from coming in contact with the mold on the site of the enamel strips of a previously treated volume. But, on the one hand, that precaution requires particular care in the planning of bending-tempering treatment and, on the other, yields only a limited solution, for a frequent change of refractory paper or cloth coaing remains necessary. Furthermore, according to the technique of patent EP No. 0 003 391, each new paper or cloth coating must be bored according to a specific pattern to enable the vacuum through the holes of the refractory mortar mold to be exerted.

SUMMARY OF THE INVENTION

The present invention concerns a molding of glass sheet in which it is possible to treat in succession a large number of glass volumes of different sizes and capable of being enameled over all or part of one of their faces, without an overly frequent change of equipment nor overly lengthy preparation of that equipment being necessary.

The molding process is such that, according to the process of publication EP No. 0 003 391, the glass sheet is heated in horizontal position in a heating furnace, transferred vertically to an upper mold and flattened against that upper mold, said upper mold having a radius of curvature greater than the radius of curvature that it is desired to impart to the glass sheet and, finally, the glass sheet is dropped on a binding frame where the glass sinks under the effect of inertia and gravity. The improvement according to the invention consists of a modification of the technique of vertical transfer of hot glass: the glass is not sucked up by the upper mold itself, but by a vacuum created on the periphery of said upper mold.

For application of the transfer process according to the invention, an upper mold is used, placed in a bottomless vacuum box fastened on a suction chamber. The unperforated upper mold is smaller in dimensions than the glass sheet.

Preferably, and though only an advantageous variant of the invention is involved, the upper mold has its lower face, in contact with the glass, situated at a height less than that of the lower limit of the side walls of the bottomless box.

That measure, taken in relation to the upper mold, has as its prime effect the fact that the glass sheet no longer enters the vacuum box, but remains outside of same. This, of course, entails greater side leaks and the need for greater suction force. However, it seemed that this apparently minor and rather unfavorable measure permitted a number of particularly advantageous developments of the invention.

In the first place, and this is a direct advantage, even in case of poor centering of the glass sheet in relation to the upper mold, it is no longer to be feared that the edges of the sheet will enter in contact with the walls of the vacuum box, then resulting in irremediable marking of the glass.

This freedom of positioning of the sheet in relation to the upper mold and especially to the suction box opens up a wide number of choices in relative dimensions of the sheet, mold and box.

It thus becomes possible to work glass sheet having relatively varied shapes with the same system, that is, without change of either suction box or upper mold.

Thus, when the volumes of glass treated successively present different dimensions and it is sought to obtain large radii of curvature that can possibly vary from one volume to another, good results are obtained with an upper mold having an infinite radius of curvature and, therefore, flat, the function of which is then limited to assisting the vertical transfer of glass sheet heated to its softening temperature. The actual bending of the sheet is then carried out exclusively by sinking of the glass sheet on a binding frame.

In that case, a small upper mold is preferably chosen, that is, one whose dimensions are well below those of the volume treated.

Thus, when the volumes have undergone enameling on their periphery, it is possible to choose a mold whose dimensions are such that the upper mold does not enter in contact with the coat of enamel. The mold is then advantageously chosen in dimensions corresponding to the smallest free glass surface, that is, to the unenameled part present on the different volumes treated. According to the invention, even when that free surface occupies only a small proportion of the surface of the volume or is asymmetrically distributed on the periphery of same, a molding is possible with individual upper molds and vacuum boxes for different model windows.

When smaller radii of curvature are sought, it is preferable to substitute for a flat upper mold a curved upper mold assuring premolding. But there again, even if the finished volumes must present different contours for naturally quasi-identical dimensions, the replacement of the upper mold can be avoided. Furthermore, according to the invention the upper mold can advantageously be provided with systems making it possible to obtain a more or less appreciable curvature of the upper mold, its curvature nevertheless remaining less than that of the binding frame. The upper mold is thus modified then with a simple adjustment in minimum time.

When the volumes differ too much as far as their dimensions and especialyy their contour after molding are concerned, the change of upper mold cannot be avoided. However, the replacement of the upper mold and even of the box can be carried out very rapidly.

According to one particularly preferred embodiment of the invention, the upper mold is made of a light material, like refractory steel, for example, which greatly facilitates its handling. Furthermore, the upper mold advantageously being mounted not in one piece with the vacuum box, the mere replacement of the upper mold, in accordance with the dimensions of the window, is possible inside even the heated molding chamber, that is, with minimum losses of heat and time.

Those different applications of the invention show the great technical profusion created by the freedom accorded the selection of the glass sheet in relation to the mold and the suction box. The enumeration previously made well illustrates the versatility of a molding cell according to the invention, for volumes of glass differing little from each other can be successively treated without causing the slight additional interruption of production and volumes of glass differing markedly in size, contour or even location of decoration can likewise be treated with a minimum of molds and boxes.

BRIEF DESCRIPTION OF THE DRAWINGS

Other advantages and characteristics of the invention will appear in a more detailed manner in the specification which follows, given with reference to the attached drawings, which represent.

DETAILED DESCRIPTION OF THE INVENTION

Figure 1:
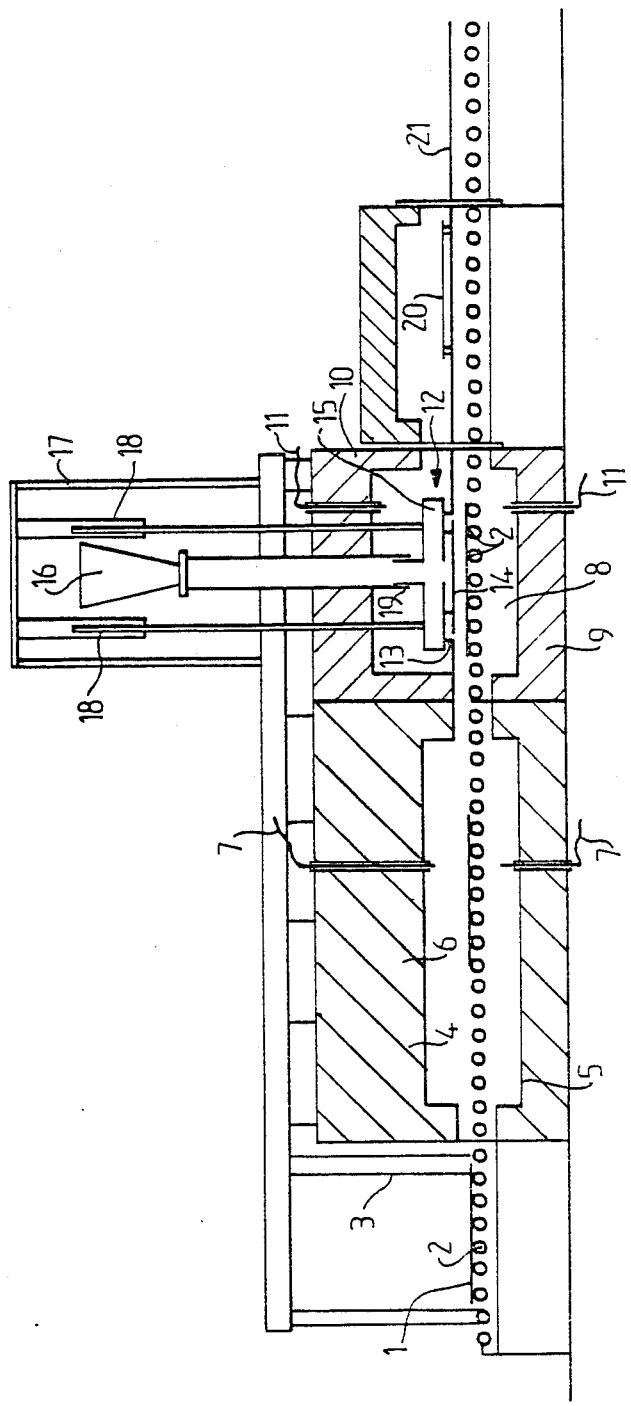
FIG. 1: a schematic view of a molding unit using a molding system according to one embodiment of the invention.

FIG. 1 illustrates the use of a premolding cell according to the invention.

The glass sheet 1 is deposited on a roller bed 2 manually or preferably by an automatical loading system not represented here. The roller bed 2 crosses a horizontal heating furnace or tunnel furnace 4, the mouth of which is closed, for example, by shutters 3. The tunnel furnace 4 contains a floor 5 and a vault 6 of refractory material and is heated by electric resistors 7. It makes possible the heating of glass sheet to a temperature close to its softening point, on the order, for example, of 630°–640°

C. At the mouth of the furnace the sheets, still on their roller bed, are directly conducted to the molding cell 8.

That molding cell 8 contains a floor 9 and a vault 10, equipped with electric resistors 11 which keep the temperature at approximately 680°–700° C.

The position of the glass sheet is located, for example, by a photoelectric cell or, better yet, by a mechanical detector. That detector consists advantageously of a finger forming a lug, carried, for example, by one of the rollers and capable of retracting under the thrust of the glass sheet. The movement of the detecting finger is registered by electronic means advantageously placed outside the heated chamber, which, with adjustable time lags controls different subsequent operations and, notably, the stop of the glass sheet under the transfer system 12 or, more specifically, under the upper mold 14. That transfer system 12 comprises essentially a bottomless suction box 13 and an upper mold 14. The box 13 is fastened on a suction chamber 15 connected to a suction device 16, for example, of the Bertin pump type. The assembly formed by the mold 14, the box 13 and the chamber 15 is suspended from a frame 17 by means of jacks 18 or any other up-and-down system making it possible to lower or raise the box 13 and the mold 14 integrally fixed thereon. To make possible those up-and-down movements, the suction chamber 15 is connected to the suction device 16 by means of idle flanges 19 assuring tightness.

In low position the mold 14 is approached within a few millimeters by the sheet glass so that the latter is raised by the suction flow and flattened against the mold. At that time the transfer system 12 is raised, which makes it possible to introduce under it a frame 20 mounted on rails 21. That frame 20, having the shape to be imparted the glass sheet, can be a frame open in the center or, in other words, a "bending skeleton." The suction is then at least partially eliminated and the glass sheet is therefore placed on the frame 20 in order to be transferred to the tempering station.

Figure 2A:
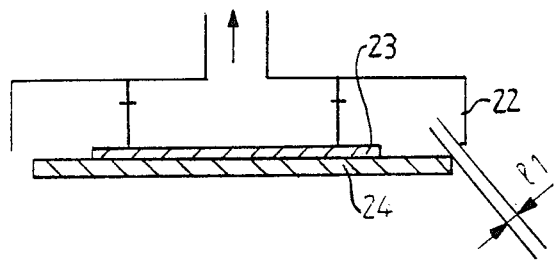
FIG. 2A, 2B: longitudinal sections of two transfer assemblies according to two embodiments of the invention.

FIG. 2A more precisely illustrates an embodiment of a transfer system according to the invention. A bottomless vacuum box 22, connected to a suction device depicted here by the arrow 23, supports an upper mold 24. The box 22 and the upper mold 24 are preferably made of refractory steel. Mold 23 presents dimensions less than those of the glass sheet 25. FIG. 2A, like FIG. 2B moreover, corresponds to the vertical transfer phase during which the glass sheet is in high position, flattened against the upper mold. Between the glass sheet 24 and the side walls of the box 22 a side leak space $l_1$ is preserved. That space $l_1$ is preferably on the order of 5 mm, a lower value markedly increasing the risks of contact between the box and the side walls of the glass and a higher value necessitating an increase of suction power and then, consequently, entailing a higher operating cost.

The upper mold 24 presents dimensions less than those of the glass sheet. It was found that even with upper molds whose edges are 20 to 40 mm away from the periphery of the glass sheet, no marking of the glass sheet occurred. That possibility can be particularly used when the glass sheet in enameled on its periphery, for the enamel is then not in contact with the mold and there are no risks of degradation of the coat of enamel nor of soiling of a refractory paper or cloth inserted between mold 23 and sheet 25 or mold 24 itself.

On the other hand, the enamel possibly covering the edges of the glass sheet is never in contact with the mold, so that it is possible to pass in succession volumes presenting different enamelings.

Furthermore, and this is a very important advantage of the system according to the invention, a single flat mold can be used for a large number of glass sheet dimensions and for a large number of bending shapes to be given the glass sheet.

Figure 2B:
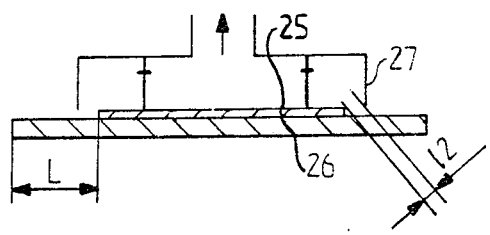

To reduce further the risks of marking of the glass by the side walls of the box 23, it is advantageous to use a system such as that depicted on FIG. 2B. In this case, the upper mold is so placed that a sheet of glass cannot enter the box. Advantageously and in order to reduce the side leak space $l_2$, the box presents dimensions only slightly exceeding those of the upper mold, which in turn is of dimensions well below those of the glass.

Thus, it is possible according to the invention to work with a box and a versatile mold, that is, capable of handling the manufacture of a multiple number of types of windows.

Working with a suction box of dimensions slightly greater than those of the upper mold, which is much smaller in size than the volume of glass treated, all of the windows presenting enameled strips on their edges can be satisfactorily bent into convex shape.

Figure 3:
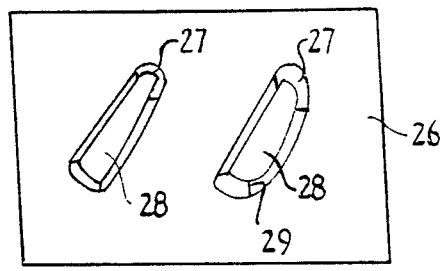
FIG. 3: a front view of an upper mold, specially designed for the transfer of two small-dimensioned glass pieces.

The transfer systems described on the foregoing figures are very suitable for medium-sized automobile windows, such as, for example, side windows or sliding roofs. The upper mold depicted on FIG. 3 is especially designed for fixed side windows or ventilating windows, windows that are, in general, approximately triangular and of small dimensions.

In this case, the upper mold consists of a plate 26 in which two holes 27, 27' are made, of dimensions close to those of the glass sheet transferred. The plate 26 bears two small plates 28, 28' of dimensions slightly less than the glass sheet. Those plates 28, 28' are situated under the plate 26, at a distance of, for example, 3 mm and are attached to said plate by fastenings 29. Those fastenings are preferably not fixed and make it possible to replace plates 28, 28' in accordance with the exact dimensions of the glass sheet. It is to be noted that in this case the plate 26 actually forms the side walls of the vacuum box. The bending frame is, of course, also adapted for the reception of two sheets of glass.

Such a system is particularly simple and economical and makes it possible to attain high rates of production.

If a slight curvature is to be imparted to the glass sheet, an upper mold slightly contoured longitudinally is preferably used. The camber of the upper mold then remains less than that which it is desired to impart to the window after bending.

A particular curvature can also be imparted to the upper mold to reduce the problem of double bending. In fact, it was previously indicated that it was important to use longitudinally contoured upper molds making it possible to bend the glass sheet into convex shape cylindrically. Now, at the time of placement on the frame 20, the softened sheet is not supported in its center and gravity tends to give it a spherical curvature in its center part. To reduce that uncontrolled transverse bending, the upper mold can, according to one advantageous characteristic of the invention, be imparted a transverse opposite contour by giving it, in the direction perpendicular to the direction of passage of the glass sheet on the rollers, a negative camber compensated by the forces of gravity at the time of placement of the softened window glass on the frame 20.

Figure 4:
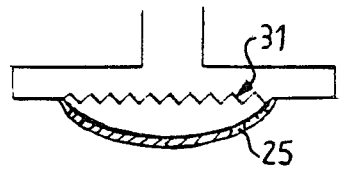
FIG. 4: a longitudinal section of a deformation system of the upper mold.
Figure 5:
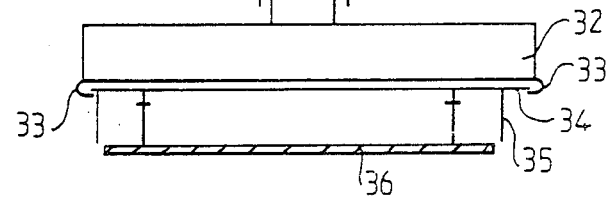
FIG. 5: a longitudinal section of a system of mounting the suction box.

To avoid too frequent a change of the upper molds, an upper mold of the type illustrated on FIG. 4, for example, is used. That upper mold 25 is equipped on its back with a system 31 of threaded rod type making it possible to curve the upper mold 35 at will. Passage from one radius of curvature to another is thus carried out by a simple adjustment of the system 31, without even having to leave the suction box 27. The interruption of production thus lasts only for the time of adjustment and does not entail any heat imbalance between the different parts constituting the premolding cell. Such a system can be used to contour the upper mold longitudinally or to countercontour it crosswise.

Combinations of the different systems mentioned above can, of course, be envisaged. An upper mold designed for simultaneous gripping of two windows and presenting two slightly contoured plates 28, 28' can, notably, be provided.

As already indicated, the side walls of the box and the upper mold are preferably refractory steel. Working with upper molds that are light and good heat conductors also greatly facilitates their replacement, which moreover is less frequent than in the prior art.

Figure 6A:
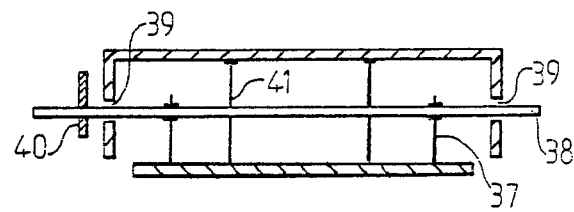
FIGS. 6A and 6B: two views in longitudinal section and along arrow F of a system of mounting the mold on the suction box.
Figure 6B:
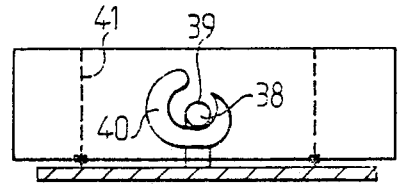

To facilitate that replacement, the suction box is advantageously made in two parts, as represented on FIG. 6. It comprises here a suction chamber 32, integrated with the up-and-down system, which bears two guides 33 in which are engaged sliders 34 carrying the skirt 35, that is, the suction box proper. The skirt 35 bearing the upper mold 36 can thus be very rapidly detached. The slide guide system can be substituted by a locking system with a catch or a locking cam on one side of the box and a hinge on the other. In that case, the box will be engaged in the molding cell obliquely, keyed in the hinge and then pivoted to be set in place and locked in position by means of the catch of the locking cam.

Such systems make it possible to replace the premolding system very rapidly with a total interruption of the installation of only 15 minutes.

Replacement of the upper mold alone is also possible. For that purpose, the mold is advantageously mounted by stays 37 on a support rod 38, as represented in FIGS. 7A, 7B. The support rod 38 is engaged in a centering hole 39 bored in the vacuum box and maintained at its other end by an eccentric 40. To position the plate correctly, lugs 41 are used, but such a system can be replaced by a two-support rod system, with centering finger and locking cam, or even with guide and locking catch.

With such a system, the upper mold alone can be replaced in only five minutes. The replacement times indicated are to be understood as "good volume to good volume", that is, they include the loading time and are to be compared with those of facilities containing refractory mortar molds and for which the production interruptions are never less than one hour.

EXAMPLE (a) General condttions:

The tests were conducted in a facility, such as previously described.

The working temperatures are on the order of 700° C. in the furnace and 680° C. in the molding cell. The temperature of the glass immediately before its suction and after its deposition on the lower mold is constant and equal to approximately 635° C.

The upper molds and the suction boxes or "skirts" are made of refractory steel. The upper mold is covered with an aluminosilicate paper 1.6 mm thick, for example, of Fiberfrax type, reference 970° F. (registered trademark of the Carborundum corporation).

Suction is obtained by means of a Bertin VT 85 type feed pump, which makes it possible to obtain a feed pressure of at least 6 bars ($6 \times 10^5$ Pa). A feed pressure P is used to lift and flatten the glass sheet against the upper mold for a period on the order of 0.7 second. The pressure is then somewhat lowered to a maintenance pressure $P_2$, fixed until the deposition of the sheet on the lower mold.

(b) Suction conditions:

The attached Table I shows the suction pressures used for the molding of $120 \times 52$ cm glass sheet intended to be used as rear window of a motor vehicle. It was decided to use a system according to FIG. 2B with a side leak $l_2$ varying between 3 and 5 mm.

The attached Table I demonstrates the possibility of working with variable side leaks, then compensating with the flow of suction air.

(c) Relative dimensions of box, upper mold and volume of glass:

The following equipment enabled convexed-tempered sliding roofs for motor vehicles to be made. The volume is 5 mm thick.

Flat upper molds were used here, the lower faces of which are placed approximately 5 mm below the base of the box.

The attached Table II illustrates how with a small number of boxes and molds different types of windows can be treated.

Figure 7:
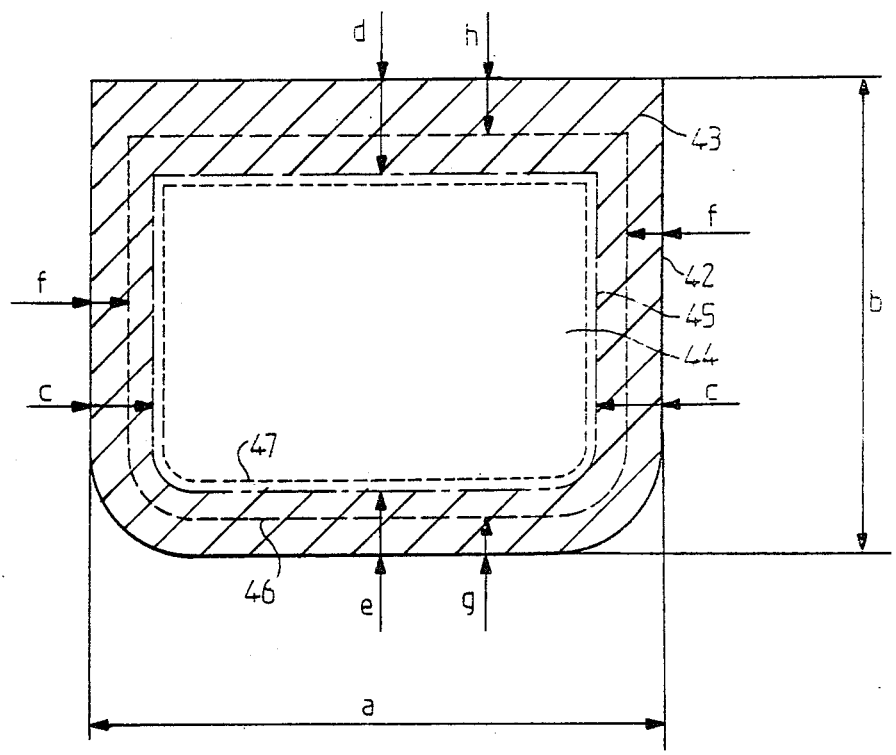
FIG. 7: an example of the relative geometries of the box, of the upper mold and of the window in the case of a window presenting enameling on its periphery.

(d) Case of a volume enameled on the periphery:

FIG. 7 illustrates the geometry of a volume of glass enameled on the periphery. The Examples is of the manufacture of sliding roofs designed in particular for Peugeot 205 cars (registered trademark).

Those windows 42 have a length a of 795 mm and a width b of 650 mm. Their periphery 43 is covered with a coat of enamel, while the center part 44 is left without enameling. The limit of the enameled zone 43 is represented in broken lines 45. The peripheral coat extends on the sides over a width c of 48 mm, in the back of the window over a width d of 128 mm and in front over a width e of only 52 mm. Over one-third of the surface of the window is thus enameled and, furthermore, that enameling is not distributed symmetrically.

However, with a molding system according to the example of FIG. 2B, containing a box 46 leaving side leaks f, g, h respectively equal to 25 mm, 20 mm and 60 mm and an upper mold 47 represented in dotted lines, placed 5 mm from the limit 45 of the enameled zone 43, the window was taken up by the molding system, that is, it was sucked up and flattened asymmetrically without any deterioration of the enameled zone, which is at no time in direct contact with the upper mold or the suction box.

Thus, a long series of windows of this type can be produced without interruption, the refractory paper or cloth protecting the upper mold not being subjected torapid deterioration or disintegration produced by the enamel.

This example illustrates the very great flexibility of the system according to the invention.

(e) Optical quality:

When the windows enter the driver's field of vision, it is very important for their optical quality to be faultless. This was verified with the series of windows illustrated on Table III as follows: a window is declared satisfactory if a mark projected on a screen in order to constitute two vertical and parallel lines, 12 mm apart, is not distorted by more than 4 mm, when a window is interprosed on the light path, the window forming an angle of 10° with vertical and of 15° with the light ray.

The distances are noted negatively if the box (or upper mold) has dimensions less than those of the glass sheet treated.

In the last column of Table III, the value (in mm) of the camber given the upper mold is indicated. That camber is counted negatively when the mold is counter-contoured. The reference value given is that of the contour obtained for the glass sheet after bending into convex shape.

Example 7 illustrates the possibility of a marked reduction of opposite binding, thanks to the use of an upper mold transversely counter-contoured.

In all cases a 3-mm window successfully underwent the aforementioned test, which guarantees that it is of an optical quality superior to that required by European standards (Standard R 43).

TABLE 1

| Thickness of glass | $l_1$ | $P_1$ (bars) | $P_2$ (bars) |
| --- | --- | --- | --- |
| 3 mm | 3 mm | 3 | 2.5 |
| 3 mm | 5 mm | 5 | 2.5 |
| 4 mm | 3 mm | 4 | 3.5 |
| 4 mm | 5 mm | 6 | 3.5 |

TABLE II

| Volume of glass (mm) | Box (mm) | Upper mold (mm) |
| --- | --- | --- |
| 830 × 430 | 780 × 408 | 730 × 355 |
| 849 × 441 | | |
| 761 × 401 | 700 × 323 | 650 × 275 |
| 741 × 386 | | |
| 746 × 341 | | |
| 880 × 311 | 870 × 305 | 821 × 251 |
| 980 × 52 | 970 × 510 | 920 × 460 |

TABLE III

| | Type of side leak | Distance from end of box to end of glass | Distance from upper mold to end of glass | Contour |
| --- | --- | --- | --- | --- |
| (1) | 1 | +5 mm | −7 mm | — |
| (2) | $l_1$ | +5 mm | −7 mm | — |
| (3) | $l_2$ | +5 mm | −40 mm | — |
| (4) | $l_3$ | −20 mm | −40 mm | — |
| (5) | $l_2$ | +5 mm | −7 mm | 10/10 |
| (6) | $l_2$ | +5 mm | −7 mm | 20/10 |
| (7) | $l_2$ | +5 mm | −7 mm | −7/−3 |

What is claimed as new and desired to be secured by Letters Patent of the United States is:

1. A process for bending glass sheets, comprising:
    transferring said glass sheet vertically to an upper mold within a suction means and said mold having a radius of curvature greater than the radius of curvatue it is desired to impart to said glass sheet, by applying suction between said suction means and the periphery of said glass sheet which at all points extends beyond the periphery of said upper mold,
    dropping the glass sheet from said upper mold onto a bending frame, and
    allowing the glass sheet to bend thereon under the influence of inertia and gravity.

2. Process of claim 1, wherein said glass sheet has a coat of enamel on its periphery.

3. Process of claim 1, wherein said glass sheet is applied asymmetrically against the upper mold.

4. Apparatus for glass sheet molding, comprising:
    a heating furnace,
    means for conducting a glass sheet from said furnace to a molding station, said molding station comprising
    an upper mold against which said glass is applied by reason of a suction created around the periphery of said glass sheet which at all points extends beyond the periphery of said upper mold,
    suction means for creating said suction, said suction means comprised of a bottomless suction box, said upper mold being located at the lowest extent of said suction box and positioned such that said glass sheet when applied to said upper mold is spaced from but proximal to said suction box,
    a lower bending frame for receiving said glass sheet from said upper mold which said upper mold has a radius of curvature greater than that it is desired to impart to the glass.

5. System according to claim 4, wherein the upper mold has its lower face in contact with the glass, situated at a height below that of the lower limit of the side walls of the bottomless box.

6. System according to claim 4, wherein said upper mold is flat.

7. System according to claim 4, wherein the box presents dimensions greater than those of the upper mold and less than those of the glass sheet.

8. System according to claim 4, wherein the upper mold consists of a plate 26 containing holes 27, 27' of dimensions close to those of the glass sheet and plates 28, 28' of dimensions less than that of the glass sheet and connected to plate 26 by fastenings 29.

9. System according to claim 4, wherein the upper mold presents a transverse counter-contour.

10. System according to claim 4, wherein said upper mold is equippd with means for varyings its curvature.

11. System according to claim 4, wherein said uppr mold is refractory steel.

12. System according to claim 4, wherein the suction box comprises a chamber and a skirt equipped with dismantling means.

13. System according to claim 4, wherein the upper mold is detachable from the box, being mounted by stays on a support rod which is engaged in holes and openings in the box.

14. An apparatus for glass sheet molding, comprising:
    a heating furnace,
    means for conducting a glass sheet from said furnace to a molding station, said molding station comprising
    an upper mold against which said glass is applied by reason of a suction created around the periphery of said glass sheet which at all points extends beyond the periphery of said upper mold, said upper mold presenting a longitudinal curvature less than the curvature that it is desired to impart to the glass sheet,
    suction means for creating said suction, said suction means comprised of a bottomless suction box, said upper mold being located at the lowest extent of said suction box and positioned such that said glass sheet when applied to said upper mold is spaced from but proximal to said suction box,
    a lower bending frame for receiving said glass sheet from said upper mold which said upper mold has a radius of curvature greater than that it is desired to impart to the glass.

* * * * *